United States Patent [19]

Ayache et al.

[11] 4,231,704
[45] Nov. 4, 1980

[54] COOLING FLUID BLEED FOR AXIS OF TURBINE ROTOR

[75] Inventors: Michel R. Ayache, Epinay sous Sénart; Jean-Claude L. Delonge, Moissy Cramayel; Daniel J. Marey, Paris, all of France

[73] Assignee: Societe Nationale d'Etude et de Construction de Moteurs d'Aviation, Paris, France

[21] Appl. No.: 929,910

[22] Filed: Aug. 1, 1978

[30] Foreign Application Priority Data

Aug. 26, 1977 [FR] France .............................. 77 26637

[51] Int. Cl.³ .............................................. F01D 5/18
[52] U.S. Cl. .................................. 416/95; 416/198 A
[58] Field of Search ............... 416/95, 198 A; 415/115

[56] References Cited

U.S. PATENT DOCUMENTS

| 2,618,433 | 11/1952 | Loos | 415/115 |
|---|---|---|---|
| 3,085,400 | 4/1963 | Sonder et al. | 416/95 |
| 3,647,313 | 3/1972 | Koff | 415/115 |
| 3,897,168 | 7/1975 | Amos | 416/95 |
| 4,008,977 | 2/1977 | Brown et al. | 416/95 |

FOREIGN PATENT DOCUMENTS

| 966804 | 10/1950 | France . | |
| 712051 | 7/1954 | United Kingdom . | |
| 836952 | 6/1960 | United Kingdom | 416/95 |

Primary Examiner—Everette A. Powell, Jr.
Assistant Examiner—A. N. Trausch, III
Attorney, Agent, or Firm—Bacon & Thomas

[57] ABSTRACT

A device for moving air from the jet flow of an axial compressor of a gas turbine group, to be conducted along the axis of the group to the turbine to be cooled. The air is moved by a wheel having an outer rim serving as a brace between two adjacent compressor disks and centripetal blading which moves the air through openings formed in the rim, to accelerate it and discharge it into a space surrounding the axis of the compressor.

3 Claims, 2 Drawing Figures

COOLING FLUID BLEED FOR AXIS OF TURBINE ROTOR

BACKGROUND OF THE INVENTION

The invention concerns the cooling of disks and/or vanes of turbines of the group of gas turbines of the axial type and is applicable particularly to aircraft turbojet engines.

It is known to circulate air in channels provided in the disk or disks and the vanes of such a turbine in order to cool them. Specifically, in French Pat. No. 2,062,769 a system of conduits is described, said system comprising an annular conduit along the shaft of the turbine to conduct the cooling air to the channels, the air being admitted at the level of the combustion chamber; the air, which may be extracted from a compressor, is conducted to the annular conduit by means of one or several tubes.

SUMMARY OF THE INVENTION

It is the object of the present invention to provide a flow of air from the compressor at pressure and temperature levels leading to the efficient cooling of the turbine.

It is also an object of the invention to provide a device ensuring the flow of air at a selected stage of the compressor and conducting said air, while accelerating it, to a conduit which extends along the shaft of the turbine.

Still another object of the invention is to provide a discharge device incorporated in the structure or the compressor itself.

The air discharge device according to the invention comprises for this purpose a wheel keyed between two rotor disks adjacent to the compressor, secured at its external periphery to the two disks so as to form between them a brace, said wheel being equipped with a centripetal impeller blade extending with its outer periphery into the jet flow of the compressor and with its inner periphery into a space surrounding the axis of the compressor. This space is in communication with channels traversing the vanes of the turbine to be cooled, said channels being at a much lower pressure compared with the pressure of the jet flow of the compressor. The impeller blade of the compressor thus moves air from the jet flow and discharges it into the space surrounding the axle, from where it is conducted to the channels. Because the impeller vane is centripetal, it defines a plurality of convergent conduits where the air taken from the jet flow is accelerated prior to being discharged into the space surrounding the shaft.

In one embodiment, the impeller vane consists of radially directed paddles, the difference in pressure between the jet flow of the compressor and the space surrounding the shaft being sufficient to ensure a centripetal flow of air in spite of the effect of centrifugal forces applied to it by the rotation of the rotor of the compressor.

BRIEF DESCRIPTION OF THE DRAWINGS

The description to be presented hereafter with regard to the figures given as examples, will aid in understanding how the invention may be realized.

DESCRIPTION OF THE PREFERRED EMBODIMENT

Figure 1:
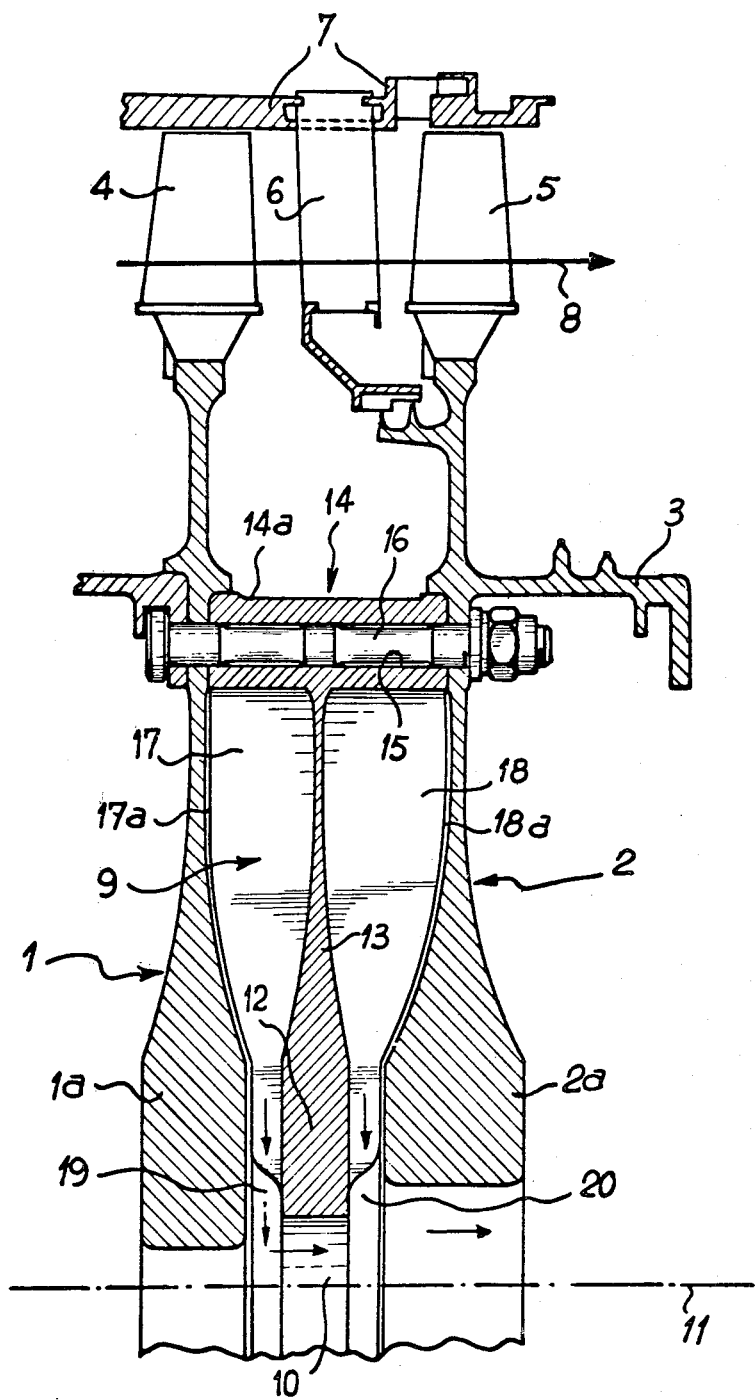
FIG. 1 is a semi-sectional axial view of a part of a compressor equipped with a wheel to move air according to the invention.
Figure 2:
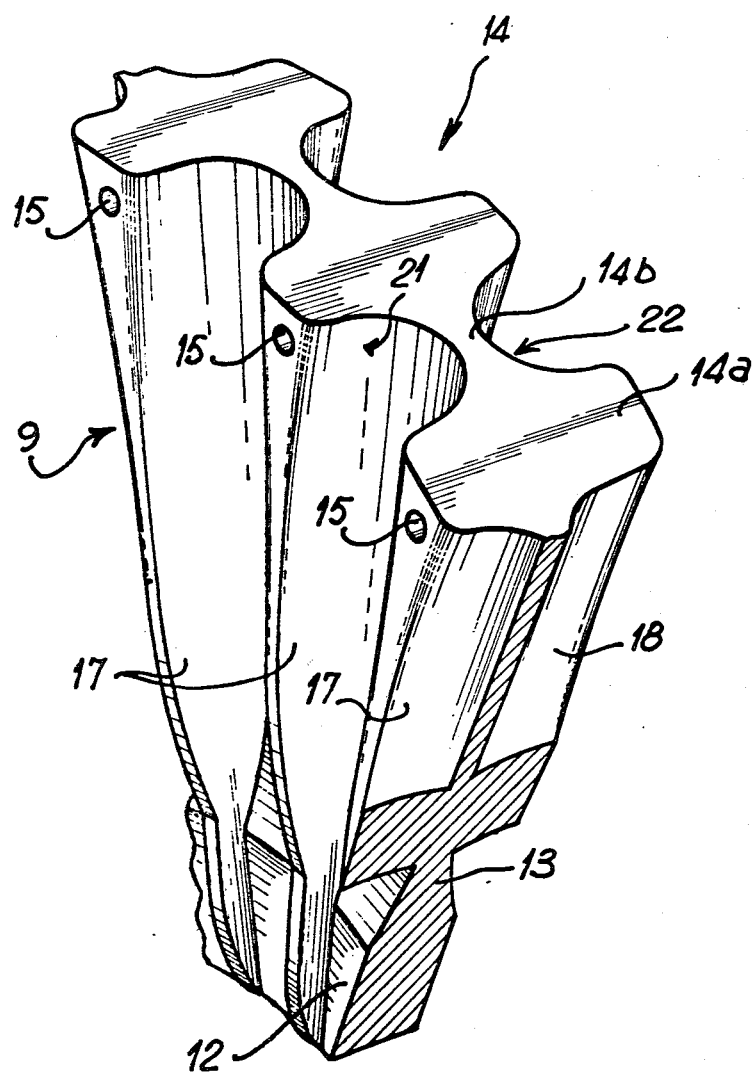
FIG. 2 is a partial view, in perspective, of the wheel of FIG. 1.

An axial compressor, a part of which is shown in FIG. 1, is part of an aircraft turboreactor which also comprises an air intake sleeve, a combustion chamber, a turbine and a propulsion tube (not shown). Two adjacent disks 1, 2 of the compressor are seen in FIG. 1, together with a part of the shaft rotating said compressor; the shaft itself is coupled with a turbine disk (not shown). In a well known manner, the air admitted by the intake sleeve is fed by the compressor into the combustion chamber; fuel injected into said chamber burns and thus produces a flow of hot gas which moves the turbine and is exhausted by the tube while producing a propulsion jet. The disks 1, 2 of the compressor are enlarged at their inner end to form the inner rims 1a, 2a, and carry on their outer ends the vanes 4, 5 which rotate adjacent a wheel of stationary vanes 6 supported by the stator 7 of the compressor, in order to compress the jet flow indicated schematically by the arrow 8. The wheel of the invention, designated by the reference numeral 9, serves the purpose of taking air 8 from the conduit, accelerate it and discharge it into the space 10 surrounding the axis 11 of the compressor, from which it is conducted by known means, not shown, to the intake of the channels provided through the disk of the turbine, in order to cool said turbine. The wheel 9 comprises an inner rim 12 connected by means of a part in the shape of the disk 13 with an outer rim 14 and is of a scalloped configuration (FIG. 2) comprising 24 enlarged parts 14a regularly spaced in an angular manner and separated by narrower parts 14b. Each of the larger parts 14a is traversed by a bore 15; a bolt passing through said bore to secure the wheel 9 between the two disks 1 and 2 and fastening said disks to both sides of the larger parts 14a of the rim 14, which thus forms a brace between the two disks. Two paddles 17 and 18 extend radially inwardly and are located in axial planes on either side of the disk part 13. The paddles 17 and 18 are continuations of the larger parts 14a.

The inner rim 12 of the wheel 9 is narrower than the space between the inner rims 1a, 2a of the disks of the compressor so that two spaces 19, 20 are provided on either side of the rim 12. The outer edges 17a and 18a of the paddles 17 and 18 follow the contours of the disks 1 and 2 of the compressor, and extend in the direction of the axis 11 into the spaces 19 and 20. The paddles 17 and 18 thus define on either side of the rims 12 and 14 and of the disk 13 of the wheel 9, a plurality of passages which communicate with the air flow 8 through the openings 21 and 22 defined by the narrow parts of the outer rim 14, between said narrow parts and the disks 1 and 2, respectively, and by the spaces 19 and 20 with the space 10 surrounding the axis 11 of the compressor. These passages are convergent from their entrance 21-22 to their outlet 19-20, because of the shape of the wheel 9 and the disks 1, 2 in axial section (FIG. 1) and because the paddles 17, 18, arranged radially approach each other from the inlet to the outlet. Because the space 10 is connected with the channels, not shown, which traverse the disk and the vanes of the turbine, it is under a pressure very much lower than the jet flow 8 of the compressor. Air is thus moved from this jet flow through the openings 21 and 22, accelerated in the converging conduits formed between the paddles 17 and 18 and is discharged at 19 and 20 into the space 10.

It should be noted that in the case of a multiple stage compressor, the device of the invention makes it possible to select the compression stage at which the cooling air is removed so that the level of the air pressure will be sufficient to ensure the circulation of said air to the turbine.

It is evident that the embodiment described is presented as an example only and that it may be modified, particularly by equivalent technical substitutions without exceeding the scope of the present invention. In particular, instead of being arranged radially, the paddles 17 and 18 may be inclined. Specifically, they may be inclined so that their entry edge is forward of their exit edge in the direction of rotation of the compressor, in order to produce air flow in the manner of scoops.

We claim:

1. In a device for moving air from the jet flow of an axial compressor for a gas turbine, said compressor having adjacent rotor disks, to be conducted along the axis of the turbine for cooling the same and including centripetal vanes in the form of spaced paddles extending radially between adjacent rotor disks, the improvement comprising:

said paddles being part of a wheel between said disks and secured at its outer periphery to said disks to form a brace and torque transmitting member therebetween, said wheel including a central disk with said paddles extending axially from opposite sides thereof.

2. A device as defined in claim 1 wherein said wheel includes an outer rim portion of scalloped configuration having spaced axial enlargements, the spaces between said enlargements and the adjacent compressor disks defining air inlet openings leading to the spaces between said paddles.

3. A device as defined in claims 1 or 2 wherein each of said adjacent compressor disks has an axially thickened rim at its inner edge, each spaced from the other, and said central disk of said wheel has an inner edge of less thickness than the space between said thickened rims and extending between said thickened rims.

* * * * *